(12) United States Patent
Yokoyama

(10) Patent No.: US 7,452,439 B2
(45) Date of Patent: Nov. 18, 2008

(54) VACUUM LAMINATION APPARATUS AND VACUUM LAMINATION METHOD

(75) Inventor: Yasuhiro Yokoyama, Kanagawa (JP)

(73) Assignee: Fuji Electric Holding Co., Ltd., Tokyo (JP)

(*) Notice: Subject to any disclaimer, the term of this patent is extended or adjusted under 35 U.S.C. 154(b) by 361 days.

(21) Appl. No.: 10/923,897

(22) Filed: Aug. 24, 2004

(65) Prior Publication Data

US 2005/0077006 A1    Apr. 14, 2005

(30) Foreign Application Priority Data

Sep. 30, 2003 (JP) ............... 2003-340345
Jan. 7, 2004 (JP) ............... 2004-001671

(51) Int. Cl.
B32B 37/10 (2006.01)

(52) U.S. Cl. ........................... 156/285; 156/382

(58) Field of Classification Search ........... 156/285, 156/286, 382, 381
See application file for complete search history.

(56) References Cited

U.S. PATENT DOCUMENTS

| | | | |
|---|---|---|---|
| 3,666,600 A | | 5/1972 | Yoshino |
| 5,993,582 A | * | 11/1999 | Yoshino et al. ............ 156/104 |
| 6,007,650 A | * | 12/1999 | Itoyama et al. ............ 156/87 |
| 6,227,270 B1 | * | 5/2001 | Itoyama et al. ............ 156/382 |

FOREIGN PATENT DOCUMENTS

| | | |
|---|---|---|
| FR | 2 814 109 | 3/2002 |
| GB | 2 245 215 | 2/1992 |
| JP | S60-194093 | 12/1985 |
| JP | 04-281982 | 10/1992 |
| JP | H07-6489 | 1/1995 |
| JP | 09-51111 | 2/1997 |
| JP | 09-051112 | 2/1997 |
| JP | 09-051113 | 2/1997 |
| JP | 09-051114 | 2/1997 |
| JP | 10-065199 | 3/1998 |
| JP | 11-62432 | 3/1999 |
| JP | 11-087743 | 3/1999 |
| JP | 2002-364266 | 12/2002 |
| JP | 2004-306420 | 11/2004 |

* cited by examiner

Primary Examiner—Richard Crispino
Assistant Examiner—Christopher Schatz
(74) Attorney, Agent, or Firm—Manabu Kanesaka

(57) ABSTRACT

A vacuum lamination apparatus for performing a vacuum lamination process on a lamination material includes a base plate having two opposing sides for placing the lamination material; and evacuation members having an approximately triangular cross-section and fixed hermetically to the base plate at the two opposing sides. Each of the evacuation members has an evacuation port with a constant distance relative to the base plate. The vacuum lamination apparatus also includes end plates fixed hermetically to ends of each of the evacuation member, and a cover sheet placed on the base plate for covering the lamination material and the evacuation members to form a lamination space for performing the vacuum lamination process.

2 Claims, 17 Drawing Sheets

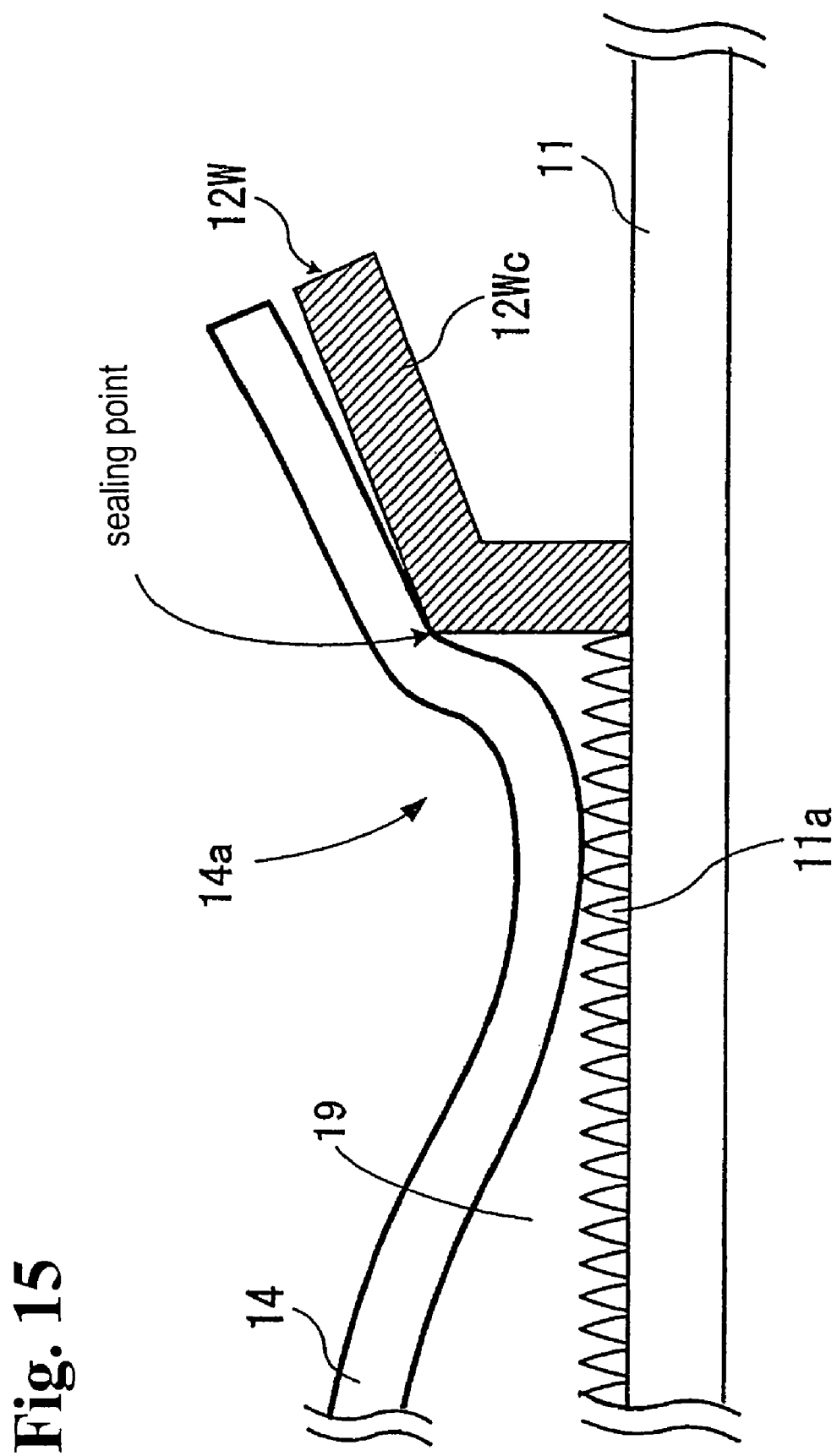

VACUUM LAMINATION APPARATUS AND VACUUM LAMINATION METHOD

BACKGROUND OF THE INVENTION AND RELATED ART STATEMENT

The present invention generally relates to a vacuum lamination apparatus and a vacuum lamination method. In particular, the present invention relates to a vacuum lamination apparatus and a vacuum lamination method of applying a vacuum lamination process to a member to be laminated such as a component of a solar cell module.

A large amount of fossil fuel has been consumed since Industrial Revolution, and the global environment has been worsened due to air pollution and global warming by $CO_2$. Accordingly, in recent years, environmental consciousness has been increased in the global scale. In this circumstance, solar cells have been expected to be as safe, easy to handle, and clean energy source. There are several types of solar cells including a single crystal silicon solar cell, a polycrystalline silicon solar cell, an amorphous silicon solar cell, and a compound semiconductor solar cell. Among these types of solar cells, the amorphous silicon solar cell can be a flexible and large area solar cell with relatively low cost, thereby increasing applications. In general, the solar cell module is exposed to open air. Accordingly, it is necessary to improve durability against temperature, humidity and external pressure for a reliable device. One of techniques to meet the requirement is a vacuum lamination process.

FIGS. 16(A) and 16(B) are schematic views of a conventional vacuum lamination apparatus, in which FIG. 16(A) is a perspective view thereof, and FIG. 16(B) is a sectional view taken along line 16(B)-16(B) in FIG. 16(A). The conventional vacuum lamination apparatus comprises a base plate 1001, a tube 1003 arranged on the base plate in a ring shape and having evacuation holes 1002 in an inside wall thereof, and a vacuum pump 1008. The tube 1003 is fixed onto the base plate 1001 with a fixing material 1004. A cover sheet 1005 entirely covering the tube 1003 with the ring shape forms a processing space 1006 for the lamination process.

In the vacuum lamination process, first, a solar cell module component 1007 with a sheet shape constituting a solar cell module is placed in the vacuum lamination apparatus. Then, the vacuum pump 1008 exhausts air between materials in a degassing process. The materials are heated up to a temperature at which a sealant material contained in the solar cell module component can be cross-linked or cured, and held at the temperature for a predetermined time until the sealant material is fully cured. After that, the materials are cooled down and the vacuum pump is stopped, thereby returning to the atmospheric pressure.

FIG. 17 is a schematic view of a solar cell module manufactured by the vacuum lamination apparatus. A thermo-adhesive sealant material 1011 and a top surface covering member (surface protection film) 1012 are sequentially formed on a front surface of a photovoltaic element 1010. A thermo-adhesive sealant material 1013 and a rear surface reinforcing member 1014 are sequentially formed on a rear surface of the photovoltaic element 1010.

In the conventional vacuum lamination apparatus shown in FIGS. 16(A) and 16(B), the cover sheet 1005 bends at an acute angle at a contact part with the tube in the vacuum process. When the operation continues in such a state, it is possible to generate a crack at the contact part of the cover sheet 1005 due to long term temperature stress. A leakage may lead to insufficient degassing of the materials of the solar cell module component 1007, thereby generating an air bubble in the solar cell module and causing an external appearance defect.

To solve this problem, Japanese Patent Publication (Kokai) No. 09-051111 has disclosed a technique (paragraphs 0025-0026 and FIG. 5), in which a buffer member is disposed along inside a tube to eliminate an acute angle bending portion of the cover sheet. FIG. 18 is a schematic sectional view of a conventional vacuum lamination apparatus having the buffer member disposed along inside the tube.

A solar cell module component 1020 is sandwiched between filler flow preventing materials 1026 for preventing a flow of a filler material filled in a surrounding space, and is placed on a base plate 1021 through a net 1022 for forming an air flow path. A buffer member 1024 with an L cross section is disposed along inside the tube 1023 as shown in FIG. 18. A cover sheet 1025 covers the whole tube 1023, and degassing is conducted.

In the conventional vacuum lamination apparatus shown in FIGS. 16(A) and 16(B) or FIG. 18, when the vacuum lamination apparatus is scaled-up to handle a large solar cell module, it is necessary to increase rigidity of the apparatus as a whole by increasing adhesion between the base plate and the tube. However, even if the base plate and the tube are firmly integrated together with welding, it is difficult to obtain sufficient rigidity of the apparatus as a whole as a tube shape member generally does not provide high rigidity.

Further, it is necessary to provide a buffer member for protecting the cover sheet, so that the numbers of parts and manufacturing steps increase, thereby increasing cost of the apparatus. Also, it is difficult to form a large number of the exhaust holes in the tube, thereby deteriorating evacuation performance.

In view of the problems described above, the present invention has been made, and an object of the present invention is to provide a vacuum lamination apparatus for manufacturing a solar cell module with low cost and high productivity.

Another object of the invention is to provide a vacuum lamination method for manufacturing a solar cell module with low cost and high productivity.

A further object of the invention is to provide a vacuum lamination apparatus for performing a high quality lamination process in which a cover sheet is securely sealed to suppress air leakage.

Further objects and advantages of the present invention will be apparent from the following description of the invention.

SUMMARY OF THE INVENTION

To attain the objects described above, according to the present invention, a vacuum lamination apparatus for performing a vacuum lamination process on a laminate material comprises a base plate for placing the lamination material thereon; evacuation members arranged on the base plate at opposite sides thereof to sandwich the laminate material, and having an approximately triangular cross section perpendicular to a longitudinal direction and evacuation ports at opposing sides thereof away from the base plate by a constant distance; end plates hermetically fixed to ends of the evacuation members in the longitudinal direction; and a cover sheet for covering the lamination material and the evacuation members to form a lamination space for performing the vacuum lamination process.

In such a vacuum lamination apparatus, evacuation spaces are created in the evacuation members arranged at the opposite sides of the base plate. The evacuation members have gaps formed at inner sides of the evacuation members as the evacuation ports, and is hermetically sealed relative to the base plate and the end plates. In the lamination process, evacuation is conducted through the evacuation spaces.

According to the present invention, a vacuum lamination apparatus for performing a vacuum lamination process on a lamination material comprises a base plate for placing the lamination material thereon; an air flow bed for forming an air flow path on a side of the base plate contacting the lamination material; evacuation members arranged on the base plate at opposite sides thereof to sandwich the laminate material, and having evacuation ports at opposing sides thereof; guides for bridging evacuation members and on; the base plate at opposites sides thereof to sandwich the lamination material so that a cover sheet forms bend portions at peripheral edge portions thereof in the vacuum lamination process; and the cover sheet for covering the lamination material to form a processing space for the vacuum lamination process.

With this structure, the processing space for the vacuum lamination process is formed by the cover sheet, and air in the processing space is evacuated through the evacuation ports of the evacuation members. In the vacuum lamination process of the lamination material, the guides bend the peripheral edge portions of the cover sheet where the evacuation members are not disposed, thereby increasing secondary sectional moment of the cover sheet and closely attaching the cover sheet.

In the vacuum lamination apparatus of the present invention, the evacuation members with an approximately triangular cross-section are disposed at opposing sides of the base plate to form the evacuation spaces, and the evacuation is conducted in the rigid structure. Accordingly, the apparatus of the invention can handle a large laminate module, thereby improving productivity. It is possible to make the structure simple, thereby reducing cost. In the invention, the guides are arranged on the base plate at both sides of the lamination material and bridge the evacuation members. The guides bend the peripheral edge portions of the cover sheet in the vacuum lamination process, thereby increasing secondary sectional moment of the cover sheet and closely attaching the cover sheet. As a result, it is possible to suppress air leakage, thereby performing the vacuum lamination process with high quality.

BRIEF DESCRIPTION OF THE DRAWINGS

FIG. 15 is a view showing a bend portion of a cover sheet formed at a peripheral edge thereof;

FIGS. 16(A) and 16(B) are schematic views showing a conventional vacuum lamination apparatus, wherein FIG. 16(A) is a perspective view thereof and FIG. 16(B) is a sectional view thereof taken along line 16(B)-16(B) in FIG. 16(A);

DETAILED DESCRIPTION OF PREFERRED EMBODIMENTS

Figure 1:
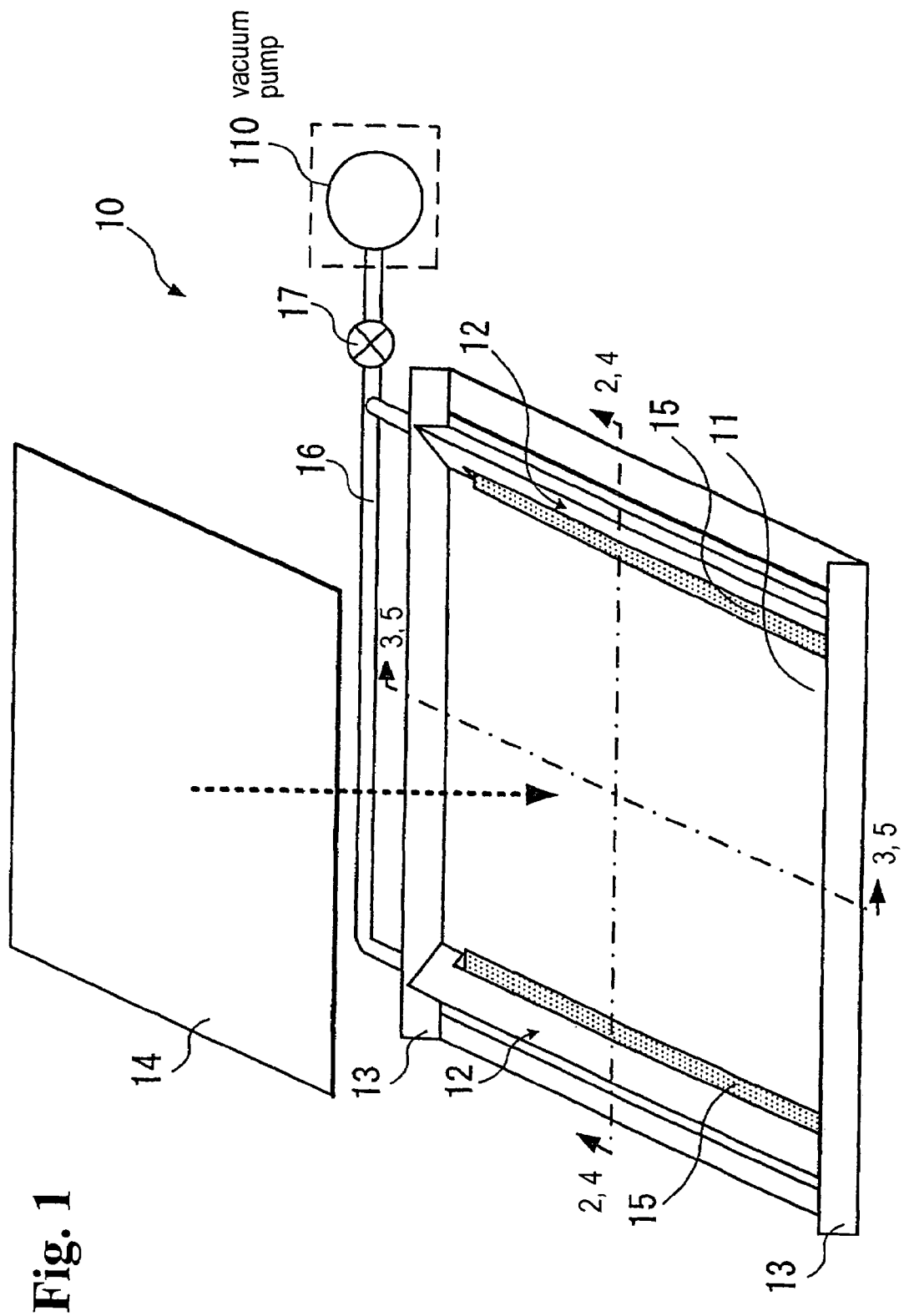
FIG. 1 is a perspective view of a vacuum lamination apparatus according to a first embodiment of the present invention.

Hereunder, embodiments of the present invention will be described with reference to the accompanying drawings. FIG. 1 is a perspective view of a vacuum lamination apparatus according to an embodiment of the invention. A vacuum lamination apparatus 10 comprises a base plate 11, evacuation members 12, end plates 13, a cover sheet 14, spacers 15, an exhaust port 16, and a valve 17.

The base plate 11 is a base member of the vacuum lamination apparatus 10 for placing a laminate module to be laminated. The base plate 11 needs to have heat resistance, rigidity, and light weight. A material of the base plate 11 is principally selected from metal and alloy including iron or aluminum, and stainless steel is favorable from the view points of weldability and corrosion resistance. While a small thickness is desired to reduce heat capacity and weight, since excessively small thickness results in low rigidity, the thickness is preferably in a range of about 1.0 to 2.0 mm.

The evacuation members 12 have a triangular cross-section with a plurality of faces. Each of the evacuation members 12 has a face perpendicular to the base plate 11 and a face inclined at a predetermined angle relative to the base plate 11. The evacuation members 12 are arranged at opposing two sides of the base plate 11 with the faces inclined at a predetermined angle and facing toward the center of the base plate.

Here, a side of the face of the evacuation member 12 inclined at a predetermined angle is defined as inside, and a side of the face of the evacuation member 12 perpendicular to the base plate 11 is defined as outside. The evacuation members 12 are fixed to the base plate 11 in a state that the faces thereof at outside contact the base plate 11 in a hermetic condition. The evacuation members 12 have gaps at inner edges thereof with a constant distance from the base plate 11. The evacuation members 12 need to have heat resistance, rigidity, and light weight. Stainless steel is principally used as a material of the evacuation member. The end plates 13 are fixed to ends of the evacuation members 12 in a hermetic condition, and seal the ends of the evacuation member 12. The end plates 13 preferably connect the evacuation members 12 to secure rigidity of the vacuum lamination apparatus 10.

The cover sheet 14 covers the base plate 11 and the evacuation members 12, and forms a space for the lamination process (hereinafter called a lamination space). The cover sheet 14 needs to have elasticity, heat resistance, flexibility, light weight, and air tightness in the evacuation process. A material of the cover sheet 14 is generally a silicone resin, which is an elastic material. In the embodiment, a silicone rubber is used (thickness: 2 mm, hardness: 50, general type silicone resin manufactured by Tigers Polymer Corporation). The spacers 15 are disposed in the gaps of the evacuation members 12 for maintaining air paths in the lamination process (described later). The exhaust port 16 is a conduit for exhausting air from the vacuum lamination apparatus 10, and is terminated at the valve 17. The vacuum lamination apparatus 10 connects to an external vacuum pump 110 via the valve 17.

In the vacuum lamination apparatus 10 having the construction described above, the evacuation members 12 fixed on the opposing sides of the base plate 11 are hermetic relative to the base plate 11 and the end plates 13. Accordingly, the gaps formed at the inner side of the evacuation members 12 become evacuation ports to form evacuation spaces in the evacuation members 12. The exhaust port 16 is inserted to the evacuation spaces through one of the end plates 13. In the lamination process, air is exhausted from the lamination space to the evacuation spaces through the gaps. From the evacuation spaces, air is exhausted out through the exhaust port 16. The evacuation members 12 are arranged at the opposing sides of the base plate 11 and have the triangular cross-section for forming evacuation spaces 12v in the evacuation members, so that the lamination process is conducted in a simple and rigid structure.

Figure 2:
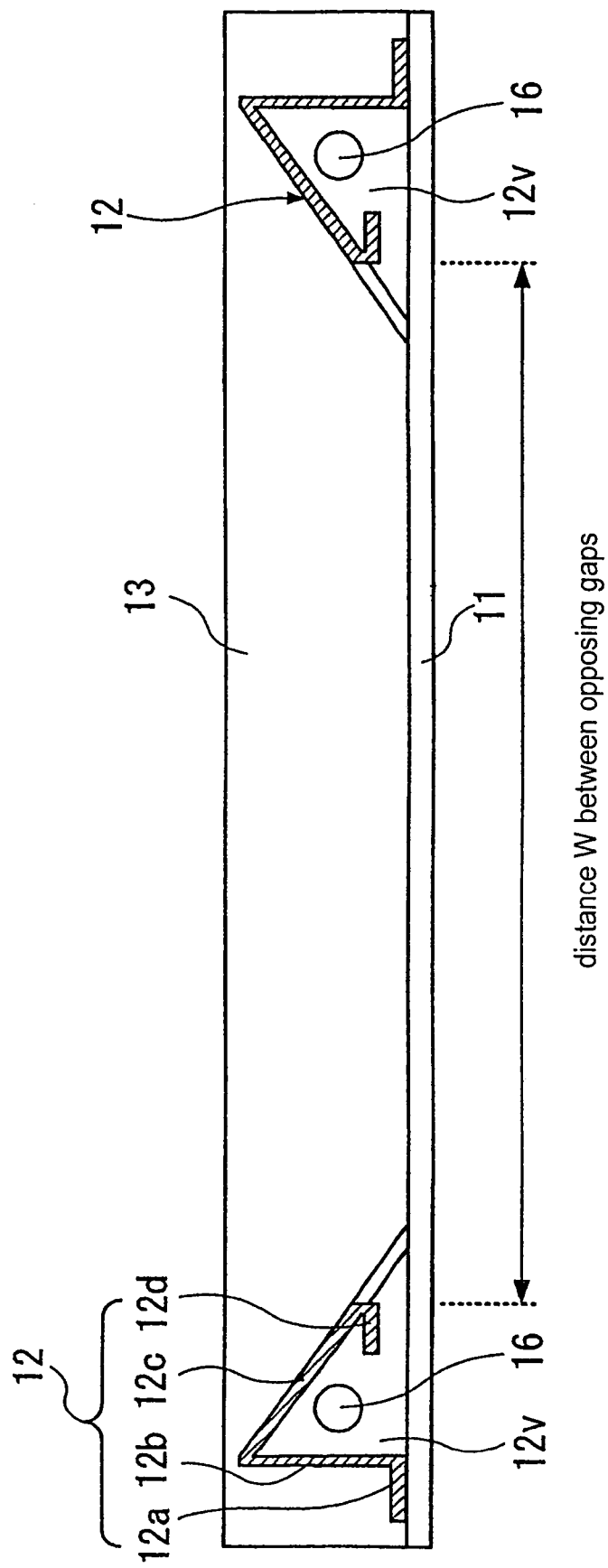
FIG. 2 is a sectional view taken along line 2, 4-2, 4 in FIG. 1.
Figure 3:
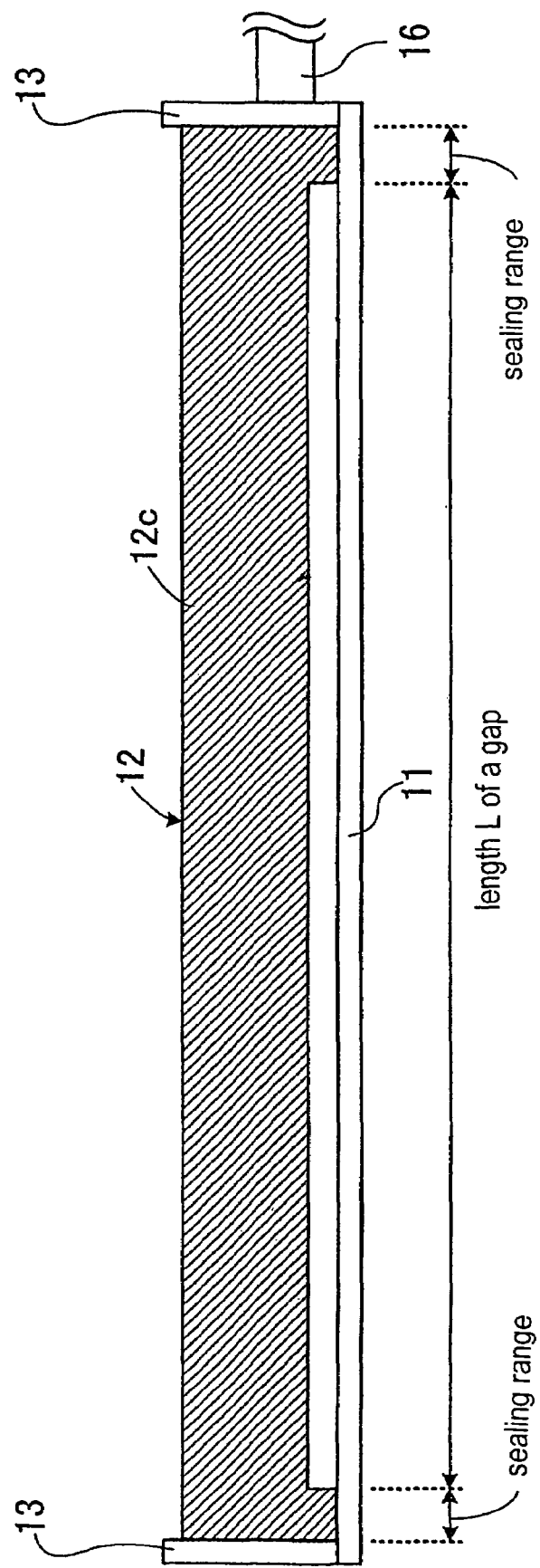
FIG. 3 is a sectional view taken along line 3, 5-3, 5 in FIG. 1.

A structure of the evacuation members 12 and the evacuation spaces 12v will be explained next referring to FIGS. 2 and 3. FIG. 2 is a sectional view taken along line 2, 4-2, 4 in FIG. 1, and FIG. 3 is a sectional view taken along line 3, 5-3, 5 in FIG. 1. The spacers 15 are not shown in FIGS. 2 and 3. As shown in FIG. 2, each of the evacuation members 12 has first bent face 12a, second bent face 12b, third bent face 12c, and fourth bent face 12d. The first bent face 12a and the second bent face 12b constitute an outer portion of the evacuation member 12, while the third bent face 12c and the fourth bent face 12d constitute an inner portion of the evacuation member 12.

The first bent face 12a and the second bent face 12b are formed such that the second bent face 12b is perpendicular to the base plate 11, thereby improving rigidity of the vacuum lamination apparatus 10. The third bent face 12c is bent with an angle of 30 degrees with reference to the base plate 11 in the embodiment. The fourth bent face 12d is bent to have a predetermined gap between the base plate 11 and a folded edge between the third bent face 12c and the fourth bent face 12d. The gap is about 2 mm in the embodiment. As shown in FIG. 3, the fourth bent face 12d is bent from the third bent face 12c such that sealing ranges with a predetermined length are formed at both sides of the gap for preventing air exhaust. The sealing range is 10 mm long in the embodiment.

The evacuation members 12 having the structure described above are fixed to the base plate 11 by electric welding in a state that the first bent faces 12a contact an outer periphery of the base plate 11. In the embodiment, the spot welding is conducted at every 100 mm. The evacuation members 12 are fixed to the base plate 11 with the spot welding, thereby shortening time of welding, and reducing manufacturing cost of the vacuum lamination apparatus 10.

The evacuation members 12 are fixed to the end plates 13, and the end plates 13 are fixed to the base plate 11 with spot welding of TIG welding. Every spot welded portion is sealed with sealant. Silicone sealant KE45 (trademark of Shin-Etsu Silicone Co.) is used as the sealant in the embodiment. The silicone sealant is applied to portions of the evacuation members 12 and the base plate 12 preferably degreased prior to the sealant application. Such an airtight structure using the sealant avoids air leakage in the evacuation process, thereby improving reliability of the vacuum lamination apparatus 10.

As described above, as shown in FIG. 2, the base plate 11 and the end plates 13 are fixed to the evacuation members 12. Further, the joints between the evacuation members 12 and the base plate 11, between the evacuation members 12 and the end plates 13, and between the base plate 11 and the end plates 13 are sealed with the sealant, so that the airtight structure is constructed. The evacuation spaces 12v are formed and have the evacuation ports at the gaps between the base plate 11 and the folded edges of the third bent faces 12c and the fourth bent faces 12d of the evacuation members 12.

A solar cell module having an elongated shape has been particularly used as a roofing material. In manufacturing such a solar cell module, the lamination space needs to have an elongated shape. In view of efficiency, the base plate 11 has preferably the opposing sides where the evacuation spaces 12v are arranged as long sides. In other words, when W is a distance between the opposing gaps (see FIG. 2) and L is a length of the gaps (see FIG. 3), it is preferable that L is equal to or greater than W. Under this condition, the evacuation spaces 12v are located at the long sides of the base plate 11, and it is possible to conduct evacuation in the lamination process even with the evacuation spaces 12v provided only at the two opposing sides.

Figure 4:
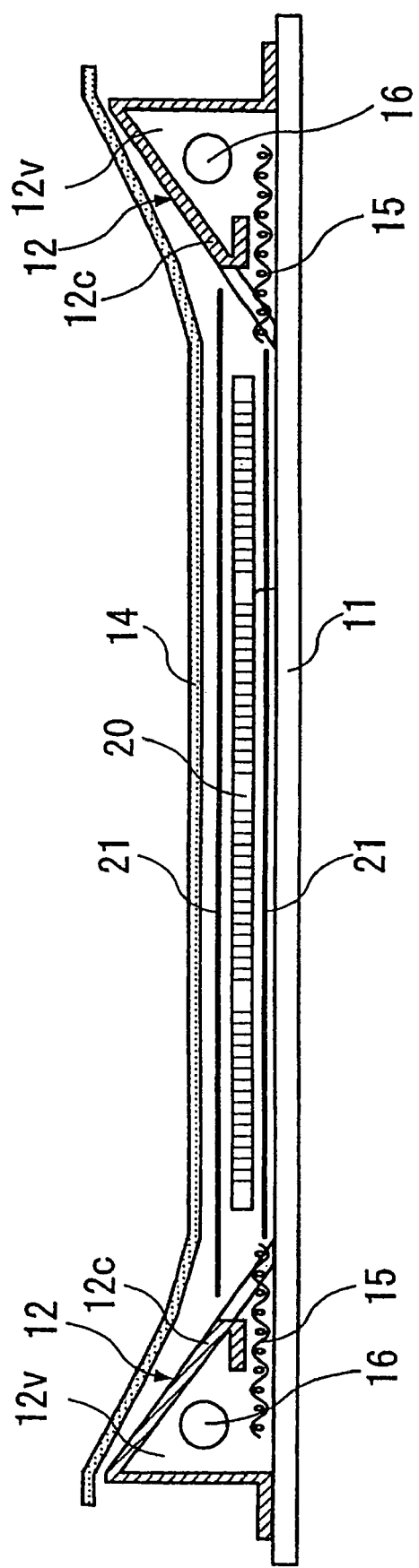
FIG. 4 is a sectional view showing a lamination process and taken along line 2, 4-2, 4 in FIG. 1.
Figure 5:
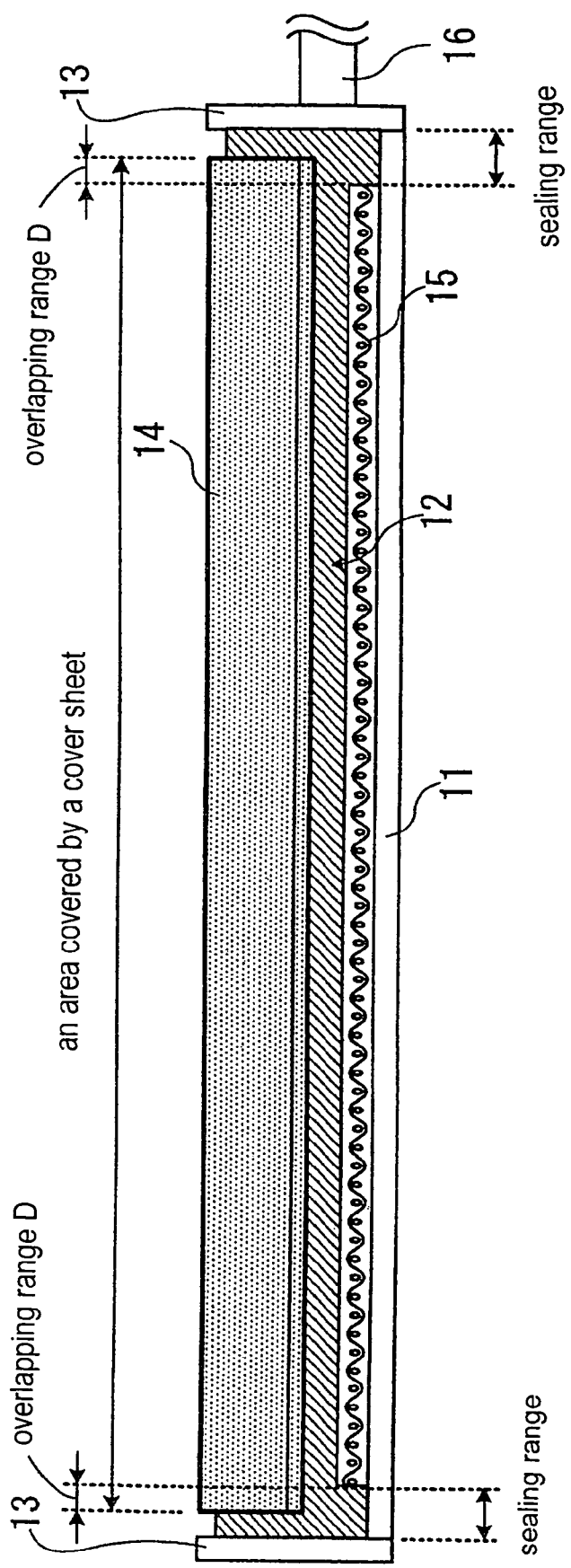
FIG. 5 is a sectional view showing the lamination process and taken along line 3, 5-3, 5 in FIG. 1.

The lamination process of the vacuum lamination apparatus 10 will be described next. FIG. 4 is a sectional view showing the lamination process and taken along line 2, 4-2, 4 in FIG. 1, and FIG. 5 is a sectional view showing the lamination process and taken along line 3, 5-3, 5 in FIG. 1.

As shown in FIG. 4, an air permeable sheet 21 is placed on the base plate 11, and components of a laminate module, i.e. the solar cell module in the embodiment, are placed thereon. Another air permeable sheet 21 is placed thereon. The spacers 15 are disposed in the gaps between the evacuation members 12 and the base plate 11. The spacers 15 are plain weave wire net made of stainless steel with a wire diameter of 0.9 mm and mesh number of 3 in the embodiment. The lamination space is formed by covering the base plate 11 and the evacuation members 12 with the cover sheet 14. As shown in FIG. 5, the cover sheet 14 is arranged such that a covering area of the cover sheet 14 is overlapped with both ends of a sealing area of the evacuation members 12 by overlapping ranges D having a specific length. The overlapping ranges D are at least 2 mm in the embodiment. In FIG. 5, components 20 of the solar cell module and the air permeable sheets 21 are omitted.

With the structure described above, the external vacuum pump 110 connected to the vacuum lamination apparatus 10 is used in the lamination process. The cover sheet 14 pushes the components 20 of the solar cell module against the base plate 11 and promotes degassing of the materials of the components 20 of the solar cell module. While the third bent faces 12c of the evacuation members 12 deform due to a pressure difference generated by the degassing, the spacers 15 prevent the third bent faces 12c and the base plates 11 from contacting each other, thereby avoiding blockage of air flow in the evacuation process. Air exhausted through the spacers 15 is vent outwardly from the evacuation spaces 12v through the exhaust ports 16. The spacers 15 are provided for securing the gaps between the evacuation members 12 and the base plate 11, so that it is possible to securely exhaust air through the gaps in the evacuation process and avoid degradation of evacuation performance.

The spacers 15 may be formed of a wire net for maintaining the evacuation performance even when the gaps are narrowed. The overlapping ranges D between the sealing range and the area covered by the cover sheet 14 are not smaller than 2 mm, so that the cover sheet 14 securely covers the gaps between the evacuation members 12 and the base plate 11 in the evacuation process, thereby improving reliability of the vacuum lamination apparatus 10.

Figure 6:
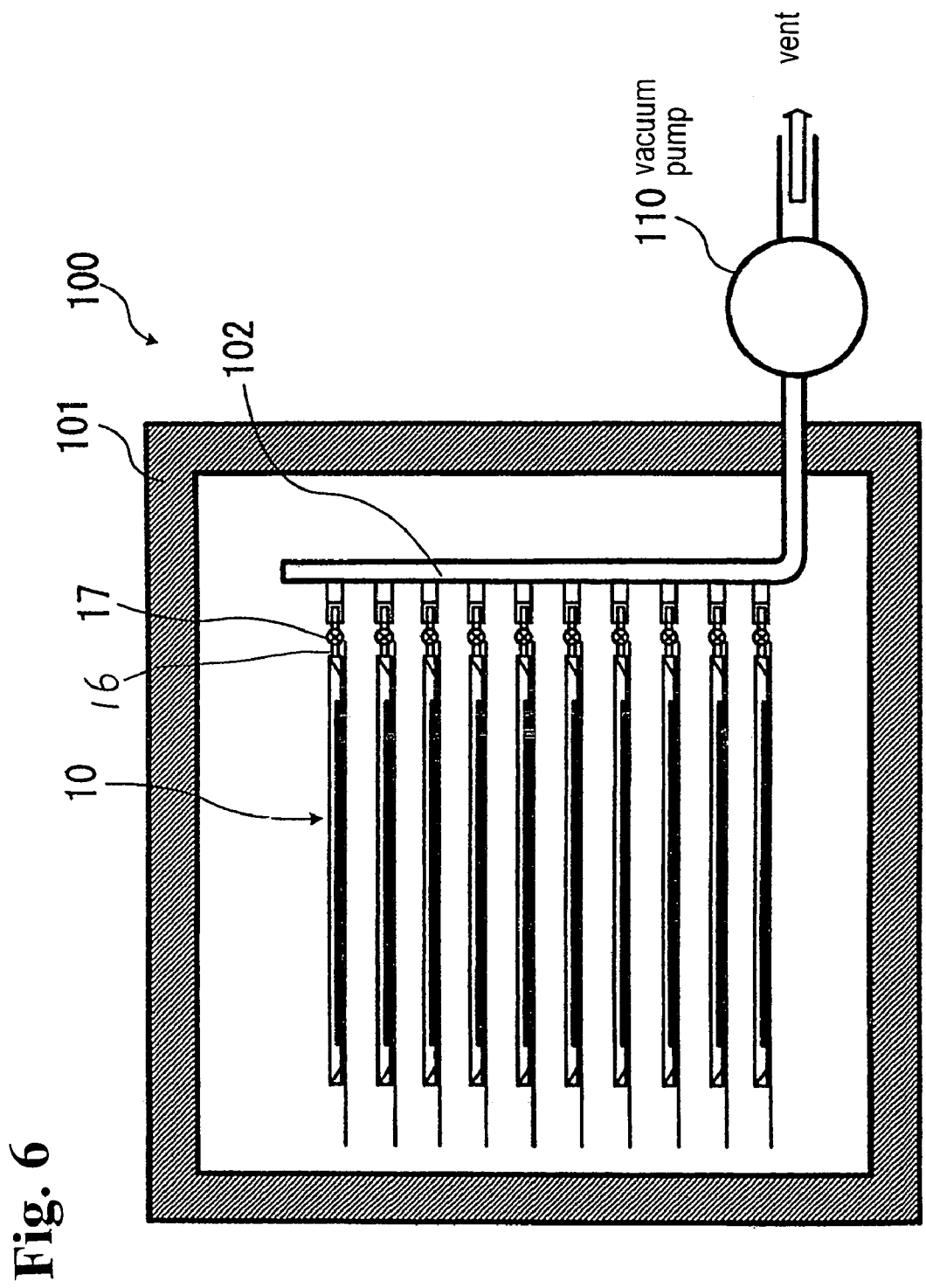
FIG. 6 is a view of a lamination module manufacturing system to which the vacuum lamination apparatus of the invention is applied.

A procedure of manufacturing the laminate module with a laminate module manufacturing system to which the vacuum lamination apparatus 10 is applied will be described next. A result of the manufacturing will be also described. In the embodiment, the laminate module is the solar cell module. FIG. 6 shows the lamination module manufacturing system to which the vacuum lamination apparatus is applied.

In a laminate module manufacturing system 100, ten vacuum lamination apparatuses 10 are horizontally arranged in a hot gas convection furnace 101. Each of the valves 17 of the vacuum lamination apparatuses 10 is connected to a manifold 102 connected to a vacuum pump 110, so that the vacuum lamination apparatuses 10 are evacuated at one time.

The procedure of manufacturing the solar cell modules using the laminate module manufacturing system 100 is as follows. First, in each of the vacuum lamination apparatuses 10, the air permeable sheet 21 is laid on the base plate 11, as shown in FIG. 4, then, the components 20 of the solar cell module are placed thereon, and again the air permeable sheet 21 is put thereon. The cover sheet 14 is placed to make the overlapping ranges D between the area covered by the cover sheet 14 and the sealing ranges of the evacuation members 12 not smaller than 2 mm, so that the lamination space is formed in the vacuum lamination apparatus 10.

After arranging every member, each vent of the valves 17 of the vacuum lamination apparatuses 10 is connected to the manifold 102. Then, the vacuum pump 110 starts to evacuate every lamination space of the vacuum lamination apparatuses 10 and degasses air between the materials of the components 20 of the solar cell module disposed in each of the vacuum lamination apparatuses 10.

While degassing by the vacuum pump 110, the apparatuses are heated up to a temperature (about 150° C.) at which a filler material contained in the components 20 of the solar cell module starts to cure, and held at the temperature for about 30 min until completion of the curing. After closing the valve 17 of every vacuum lamination apparatus 10, the vacuum lamination apparatuses 10 are taken out from the hot gas convection furnace 22 while maintaining the vacuum, and are cooled. After that, the valve 17 is opened and the lamination space of every vacuum lamination apparatus is returned to the atmospheric pressure.

Accordingly, ten sheets of the solar cell modules with a size of 500×2,000 mm are manufactured at one time. As described above, the evacuation spaces 12v are formed in the evacuation members 12 with a triangular cross-section arranged on the opposing sides of the base plate 11. Accordingly, the vacuum lamination apparatus 10 as a whole has higher rigidity as compared with a conventional tubular member. Accordingly, a large-sized solar cell module with a dimension of 500×2,000 mm can be manufactured with the vacuum lamination apparatus 10, thereby improving productivity of the solar cell modules, and reducing cost because of the simple structure.

As described above, the evacuation members 12 have a triangular cross-section, and may have a triangular shape similar to a trapezoid having a flat top face. The second bent face 12b is bent perpendicular to the base plate 11 in the embodiment, and may be bent inwardly and slanted with respect to the base plate 11. The end plates 13 are hermetically fixed to both ends of the evacuation members 12 as independent members in the embodiment. Alternatively, the end plates 13 may be formed by bending shorter edges of the base plate 11. In this case, the base plate 11 and the end plates 13 have a single integrated structure, thereby reducing manufacturing steps of the vacuum lamination apparatus 10. The spacers 15 secure the gaps between the evacuation members 12 and the base plate 11, and are formed of a wire net in the embodiment. The wire net can be replaced by other material as far as the material secures the gaps to allow air flow. The laminate module manufacturing system 100 is used for manufacturing the solar cell modules in the embodiment, and may be used for manufacturing other types of laminate modules.

As described above, the vacuum lamination apparatus of the first embodiment of the invention has the advantages over a conventional apparatus. The second embodiment of the present invention obtains further advantages.

Figure 7:
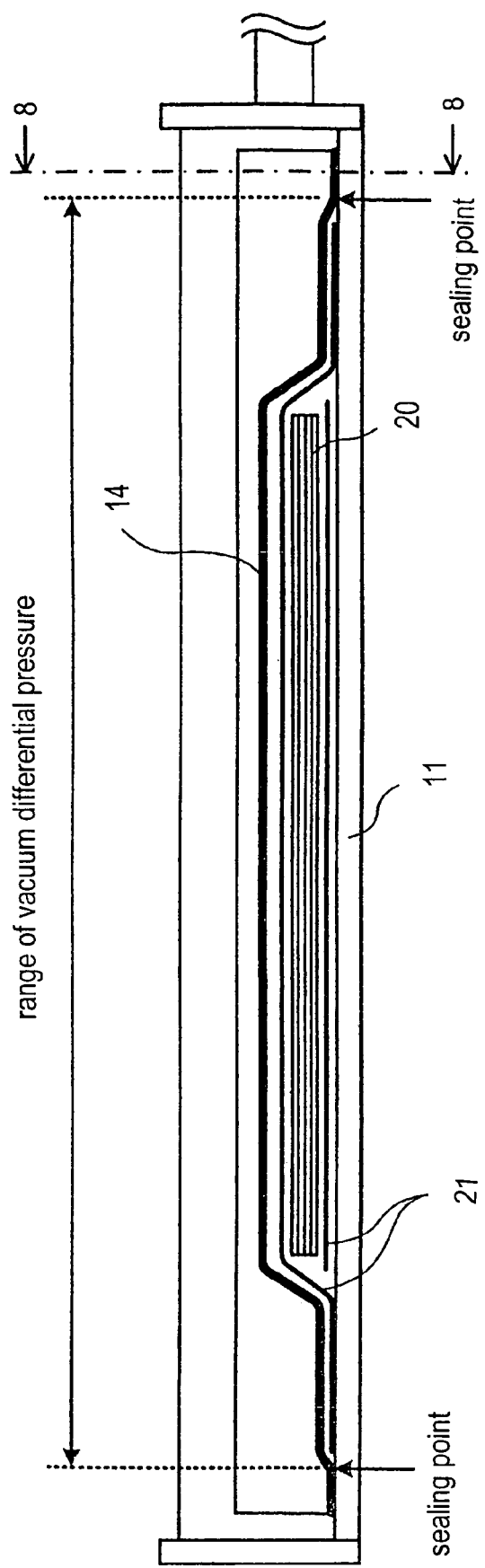
FIG. 7 is a sectional view showing the vacuum lamination process of the vacuum lamination apparatus according to the embodiment of the present invention.
Figure 8:
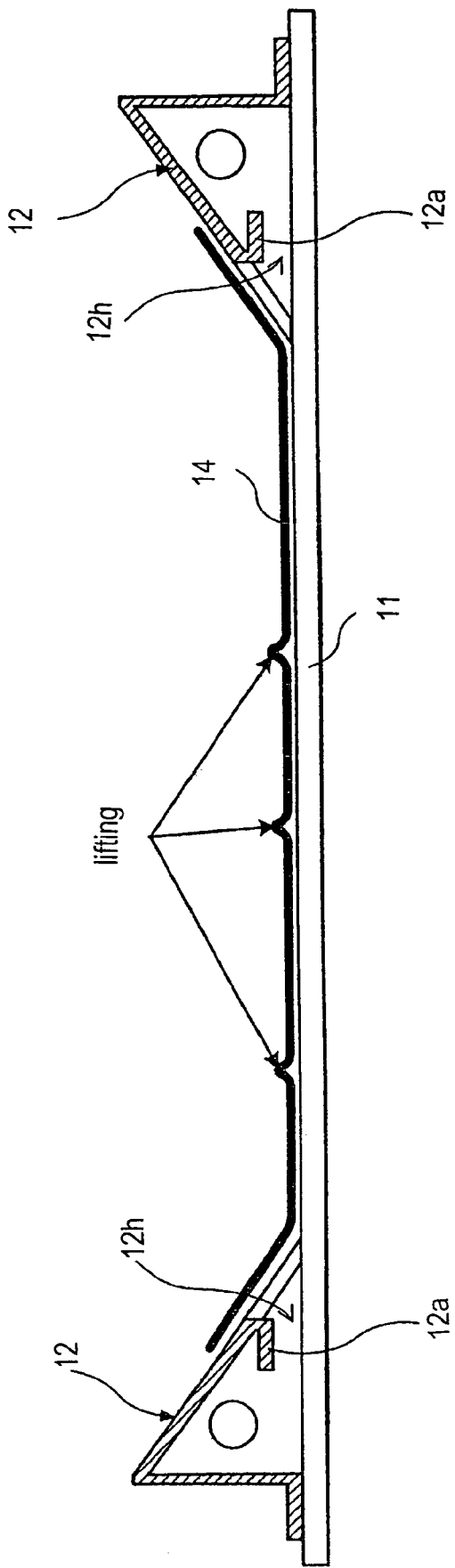
FIG. 8 is a sectional view taken along line 8-8 in FIG. 7.

In the vacuum lamination apparatus of the first embodiment, the cover sheet at peripheral sides where the evacuation members are not disposed contacts the base plate to hold the processing space in an airtight condition. FIG. 7 is a sectional view showing the vacuum lamination apparatus according to the first embodiment in the lamination process, and FIG. 8 is a sectional view taken along 8-8 in FIG. 7.

As shown in FIG. 7, in the lamination process of the lamination apparatus of the first embodiment, two peripheral sides of the cover sheet 14 contact the base plate 11 to hold the processing space in an airtight condition. Here, the cover sheet 14 closely contacts the base plate 11 only at an inner edge of a contact area with vacuum differential pressure, while outside of the inner edge just loosely contact with the atmospheric pressure. The closely contacting edge works as a seal point. A region between the seal points generated at the two peripheral sides of the cover sheet 14 develops vacuum differential pressure.

When the vacuum lamination apparatus is heated after evacuation, the cover sheet 14 expands due to heat. As shown in FIG. 8, left and right ends of the two peripheral sides of the cover sheet 14 are constrained by the inclined parts of the evacuation members 12. As a result, a portion thermally expanded is lifted up from the base plate 11, thereby losing the close contact at the seal point. With the structure, the cover sheet 14 contacts the base plate 11, so that the secondary sectional moment of the cover sheet 14 is not enough to prevent the expanded portion from lifting along the seal point. As a result, leakage may be generated through the lifted seal point, thereby lowering vacuum in the processing space. Further, the cover sheet 14 is composed of an elastic material such as a silicone resin, so that it is difficult to form a shape having desired secondary sectional moment beforehand. The vacuum lamination apparatus according to the second embodiment of the invention is designed to prevent such leakage, thereby performing high quality lamination.

Figure 9:
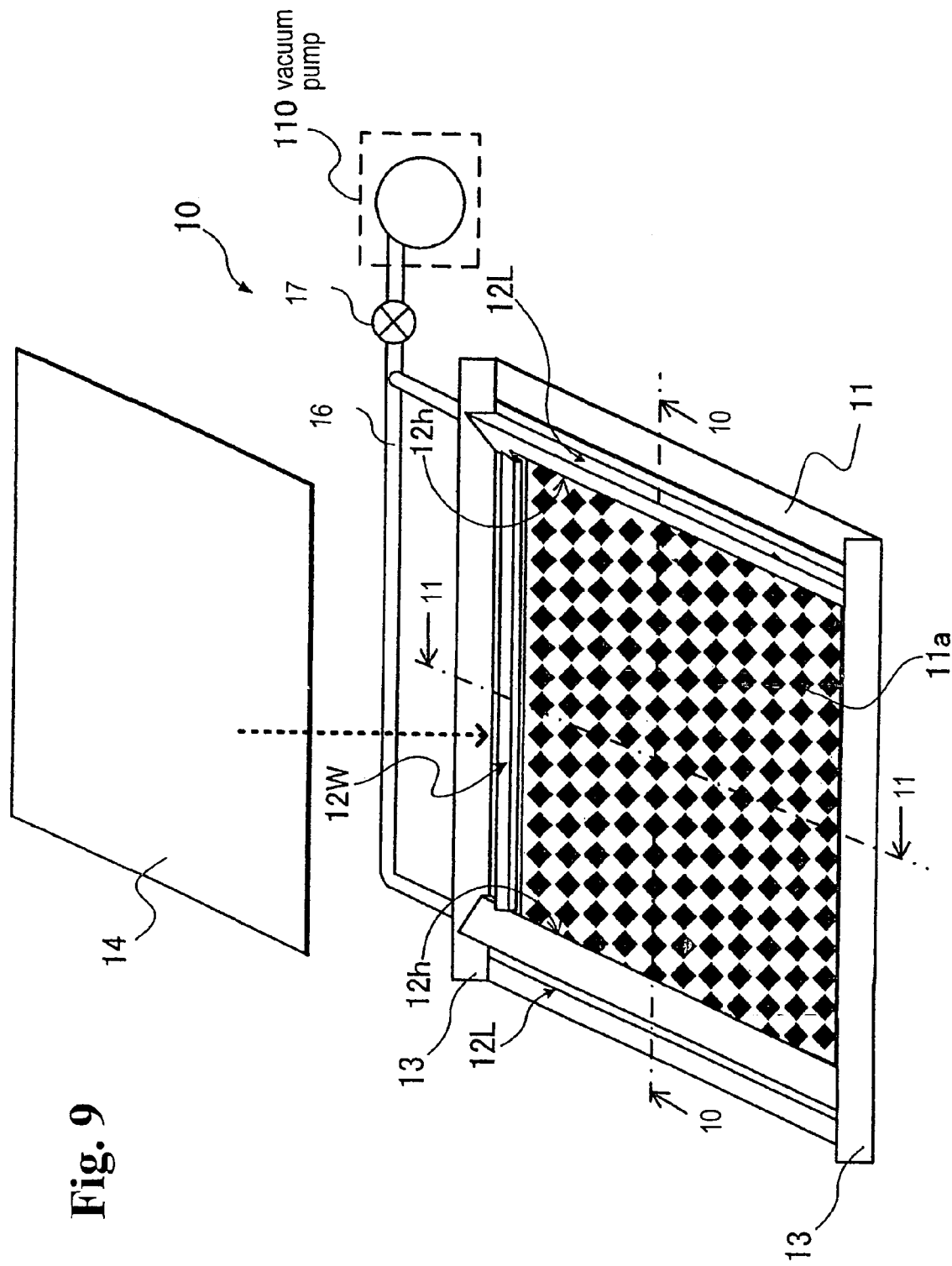
FIG. 9 is a perspective view of a vacuum lamination apparatus according to a second embodiment of the present invention.
Figure 10:
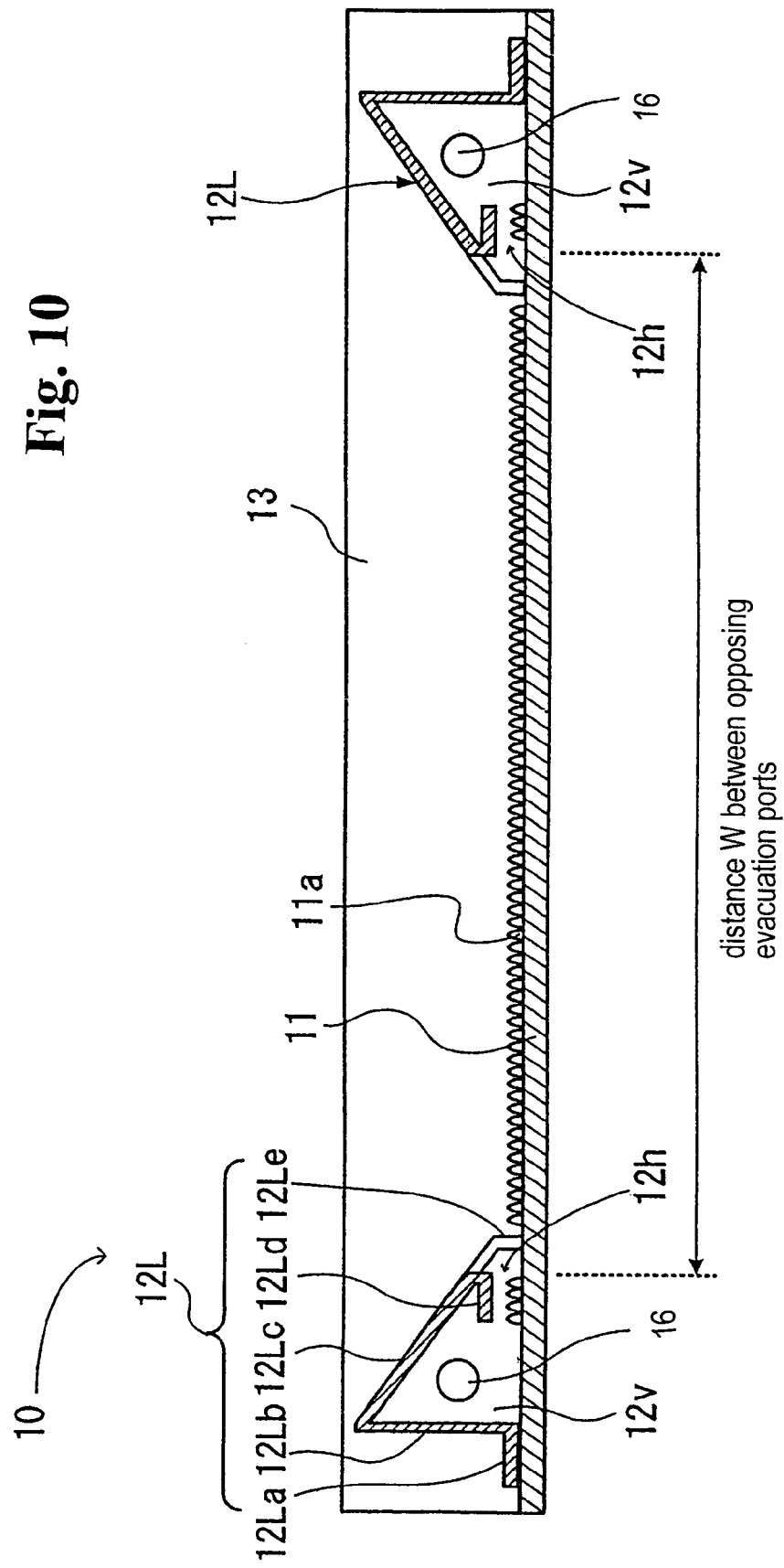
FIG. 10 is a sectional view taken along line 10-10 in FIG. 9.
Figure 11:
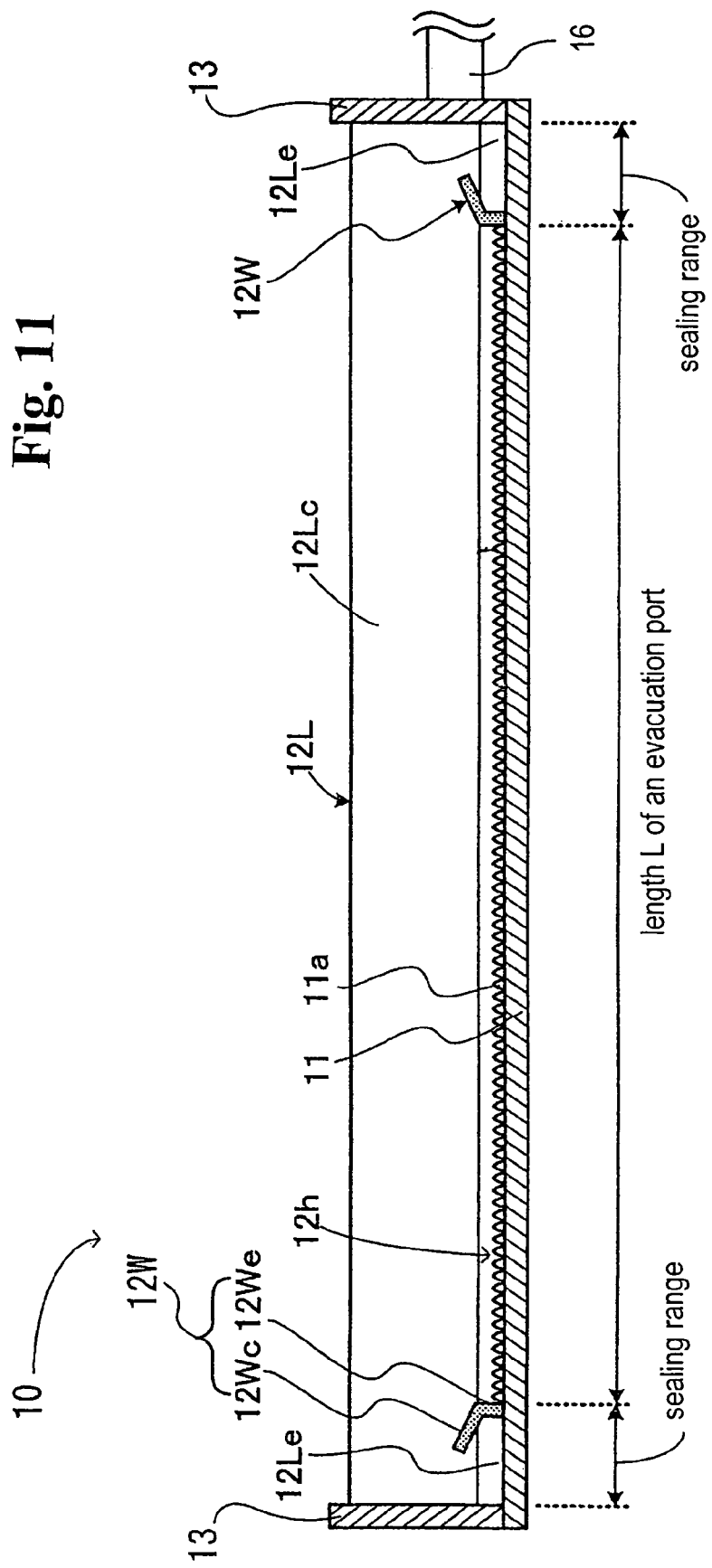
FIG. 11 is a sectional view taken along line 11-11 in FIG. 9.

The vacuum lamination apparatus according to the second embodiment of the invention will be described in detail with reference to the accompanying drawings. FIG. 9 is a perspective view of the vacuum lamination apparatus according to the second embodiment of the invention. FIG. 10 is a sectional view taken along 10-10 in FIG. 9, and FIG. 11 is a sectional view taken along 11-11 in FIG. 9.

According to the second embodiment of the invention, the vacuum lamination apparatus 10 comprises the base plate 11 for placing the lamination material (components of the solar cell module), the cover sheet 14 for covering the lamination material to form the processing space for the vacuum lamination process, evacuation members 12L arranged on the base plate 11 at both sides of the lamination material and having evacuation ports 12h at opposing sides thereof for evacuating the processing space, slender slab-like members 12W opposing each other and arranged on the base plate 11 at both sides of the lamination material for bridging the evacuation members 12L, and the end plates 13 for sealing each end of the evacuation members 12L. The vacuum lamination apparatus 10 further comprises the exhaust port 16 as a path connecting the evacuation members 12L and a vacuum pump 110, and the valve 17.

The base plate 11 is the base member of the vacuum lamination apparatus 10. In the embodiment, protrusions 11a (see FIGS. 10 and 11) are formed on a surface of the base plate 11 contacting the components of the solar cell module. The protrusions 11a works as an air flow path in the degassing process. The protrusions 11a preferably have a pitch of 0.3 to 0.8 mm and a vertical height of 0.2 to 0.6 mm. The air flow path of the protrusions 11a formed on the base plate 11 preserves heat conduction to the components of the solar cell module and secures enough air flow. An outer periphery of an area of the protrusions 11a preferably extends beyond the components of the solar cell module placed thereon. The area of the protrusions 11a in the embodiment extends to inner edges of the slender slab-like members 12W as shown in FIG. 11. With this structure, it is possible to improve evacuation efficiency of the vacuum lamination apparatus and effectively suppress the lifting of the cover sheet 14 due to increased flexural rigidity of the cover sheet 14 (described later).

The base plate 11 of the vacuum lamination apparatus for manufacturing the solar cell module needs to have heat resistance, rigidity, and light weight. A material of the base plate is principally selected from metal and alloy including iron or aluminum, and stainless steel is favorable from the view points of ease of fabrication, weldability, and corrosion resistance. While a small thickness is desired to reduce heat capacity and weight, since excessively small thickness results in low rigidity, the thickness is preferably in a range of 0.8 to 2.0 mm.

The evacuation members 12L are arranged and fixed on the base plate 11 at opposing sides of the components of the solar cell module. Both ends of the evacuation member are sealed by the end plates 13. The evacuation members 12L, like the base plate 11, need to have heat resistance, rigidity, and light weight. A material of the evacuation members may be stainless steel. Each of the evacuation members 12L has an approximately triangular cross-section having a face ascending toward a periphery of the base plate 11 at a predetermined angle. As shown in FIG. 10, each of the evacuation members 12L includes a first bent face 12La, second bent face 12Lb, third bent face 12Lc, fourth bent face 12Ld, and fifth bent face 12Le. FIG. 10 does not show protrusions and in the vicinity of the fifth bent face 12Le in order to clearly show the fifth bent face.

The second bent face 12Lb is bent at about the right angle from the first bent face 12La. The third bent face 12Lc is bent at an angle of about 30° with respect to the base plate 11. The fourth bent face 12Ld is bent such that a bent edge between the third bent face 12Lc and the fourth bent face 12Ld has a gap with a predetermined distance from the base plate 11. The gap is 2 mm in the embodiment. In the structure of the evacuation member 12L described above, the cover sheet 14 gently slopes along the third bent face 12Lc without an abrupt bend that may stress the cover sheet 14 and break the cover sheet, thereby improving productivity of the vacuum lamination apparatus. The evacuation members 12L may have a nearly triangular cross-section similar to a trapezoid shape having a top flat surface.

As shown in FIG. 11, the fourth bent face 12Ld is bent from the third bent face 12c such that sealing ranges with a predetermined length are formed at both sides of the gap for prohibiting air exhaustion. The sealing ranges are 10 mm long, for example. The gap produced by such a bend functions as an evacuation port 12h. In the sealing range, the fifth bent face 12Le is bent from the third bent face 12Lc. The fifth bent face 12Le is bent with the right angle with respect to the base plate 11. Since the gap is 2 mm in the embodiment, the fifth bent face is also 2 mm high from the base plate.

In the evacuation members 12L, the evacuation spaces 12v are formed by the evacuation members 12L and the base plate 11 for evacuating air in the processing space through the evacuation ports 12h. The exhaust port 16 is inserted into the evacuation spaces 12v through one of the end plates 13 for connecting to the vacuum pump 110. In the vacuum lamination process, air in the processing space sealed by the cover sheet 14 is evacuated to the evacuation spaces 12v through the evacuation ports 12h, and is further evacuated through the exhaust port 16.

In the vacuum lamination process, the slender slab-like members 12W work as guides to form bends in the cover sheet 14 at the two peripheral sides where the evacuation members 12L are not disposed. The slab-like members may be made of, for example, stainless steel like the evacuation members 12L. Each of the slab-like members has a first bent face 12Wc and a second bent face 12We, as shown in FIG. 11. The first bent face 12Wc is bent at a predetermined angle toward the periphery of the base plate 11. The second bent face 12We is bent at the right angle from the base plate 11. When the predetermined angle is steep or nearly flat with respect to the base plate 11, three-dimensional distortion would develop in the cover sheet 14 at a corner position formed where tips of the slab-like members 12W contact the evacuation members 12L. A slack may be generated in the cover sheet 14 around the position, thereby causing air leakage. Accordingly, the predetermined angle is favorably determined so that the first bent face 12Wc is appropriately gently inclined with respect to the base plate 11. The predetermined angle is about 30° in the embodiment. The second bent face 12We has preferably a height in a range of 2 to 3 mm for avoiding the three-dimensional distortion of the cover sheet 14. In the embodiment, the height is 2 mm to join the fifth bent face 12Le of the evacuation member 12L.

The slender slab-like members 12W contact the base plate 11 so that the second bent faces 12We are perpendicular to the base plate 11. Each end of the slab-like members 12W contacts the evacuation members 12L such that the first bent faces 12Wc and the second bent faces 12We of the slab-like members face the third bent faces 12Lc and the fifth bent faces 12Le of the evacuation members, respectively. These contacting parts are spot-welded by TIG (tungsten inert gas) welding. The first bent faces 12La of the evacuation members 12L contact the outer periphery of the base plate 11 and spot-welded at every 100 mm with electric resistance welding, for example, thereby shortening welding time and reducing manufacturing cost of the vacuum lamination apparatus.

Every spot-welded joint is sealed with a sealant for avoiding leakage in the evacuation process. In the embodiment, a silicone sealant KE45 (trademark of Shin-Etsu Chemical Co., Ltd.) is used. A portion where the sealant is applied is preferably degreased before the sealing process. The airtight structure using the sealant eliminates difficult hermetic welding, thereby reducing manufacturing cost and preserving reliability of the vacuum lamination apparatus.

The end plates 13 seal off both ends of the evacuation members 12L. The end plates 13 in the embodiment are spot-welded by TIG welding, and the joint parts are sealed with the sealant. The end plates 13 preferably extend between the evacuation members 12L to ensure rigidity of the vacuum lamination apparatus 10. Alternatively, end portions of the base plates 11 may be bent and used as the end plates, thereby reducing manufacturing steps of the vacuum lamination apparatus.

The cover sheet 14 is used for covering the components of the solar cell module to generate the processing space. The cover sheet 14 pushes the components against the base plate 11 while evacuating from the evacuation spaces 12v, thereby promoting degassing from the materials of the components of the solar cell module. Accordingly, the cover sheet 14 needs to have elasticity, heat resistance, flexibility, light weight, and air tightness for the evacuation. An elastic material such as a silicone resin, for example, a silicone rubber, is used (thickness: 2 mm, hardness: 50, general use silicone resin manufactured by Tigers Polymer Corporation). A fluororubber may be used, and a silicone resin is superior in flexibility and cost.

A solar cell module having an elongated shape has been particularly used as a roofing material. In manufacturing such a solar cell module, the lamination space needs to have an elongated shape. In view of efficiency, the evacuation members 12L having the evacuation spaces 12v are preferably long sides. In other words, when W is a distance between the opposing evacuation ports 12h (see FIG. 10) and L is a length of the evacuation ports 12h (see FIG. 3), it is preferable that L is equal to or greater than W. Under this condition, the evacuation spaces 12v are located at the long sides of the base plate 11, and it is possible to conduct evacuation in the lamination process even with the evacuation spaces 12v provided only at the two opposing sides. It is possible to perform the vacuum lamination process for a large solar cell (for example, 500× 2000 mm).

Figure 12:
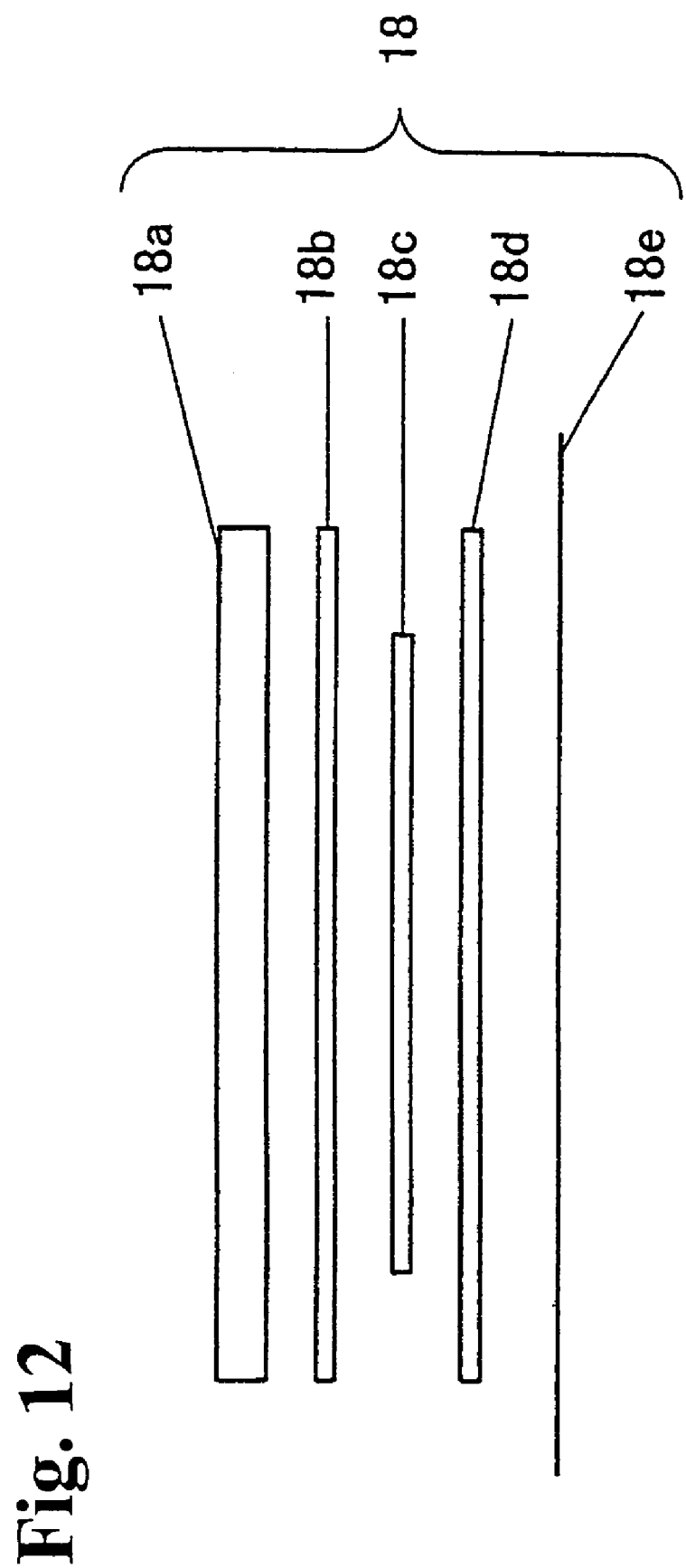
FIG. 12 is a schematic view showing components of a solar cell module to be laminated in the vacuum lamination process using the vacuum lamination apparatus according to the embodiment of the present invention.

FIG. 12 is a schematic view showing the components of the solar cell module to be processed by the vacuum lamination using the vacuum lamination apparatus according to the embodiment of the invention. The components 18 of the solar cell module comprises, from the top to the bottom in the figure, a rear surface reinforcing member 18a, a thermo-adhesive sealant 18b, a photovoltaic element 18c, a thermo-adhesive sealant 18d, and a front surface covering member 18e. In the vacuum lamination process of the embodiment, a light receiving face of the photovoltaic element 18c is arranged to face the base plate 11 (face down). Accordingly, the front surface covering member 18e has an outer dimension larger than those of the other components of the solar cell module to prevent the thermo-adhesive sealants 18b and 18d flowing out of the components from sticking to the base plate 11 in the vacuum lamination process.

In the solar cell module, light from the outside enters through the front surface covering member 18e formed of a transparent resin film on the outermost surface, and reaches the photovoltaic element 18c. Electricity is generated and drawn out from output terminals (not shown).

Figure 13:
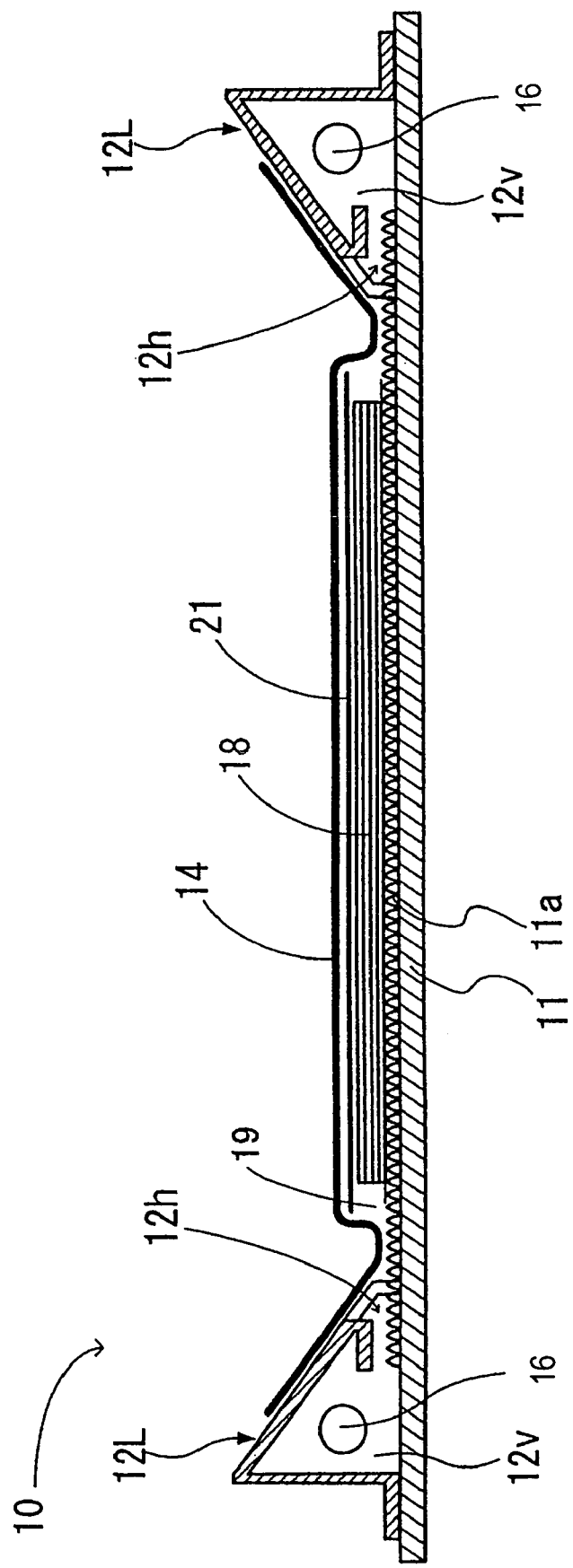
FIG. 13 is a sectional view showing the vacuum lamination process of the vacuum lamination apparatus according to the second embodiment of the present invention.
Figure 14:
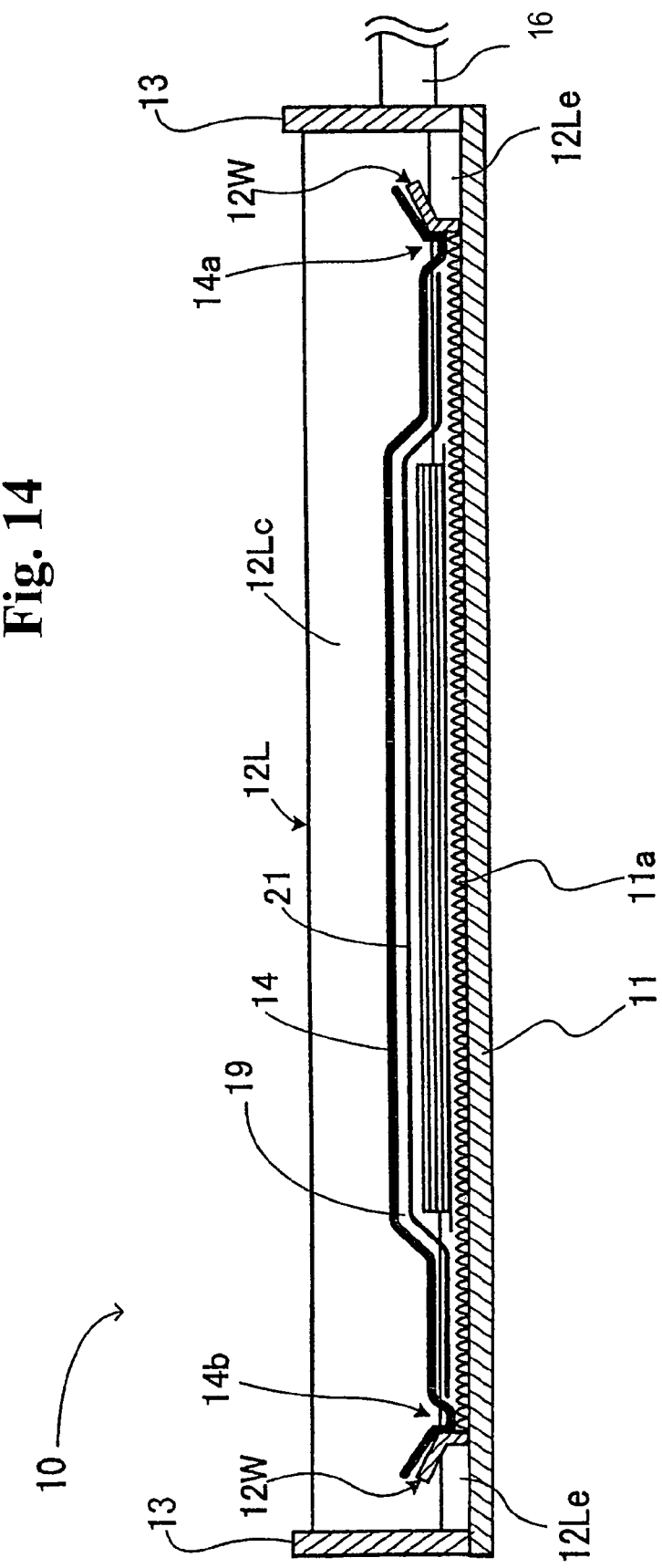
FIG. 14 is a sectional view showing the vacuum lamination process of the vacuum lamination apparatus according to the second embodiment of the present invention.
Figure 16A:
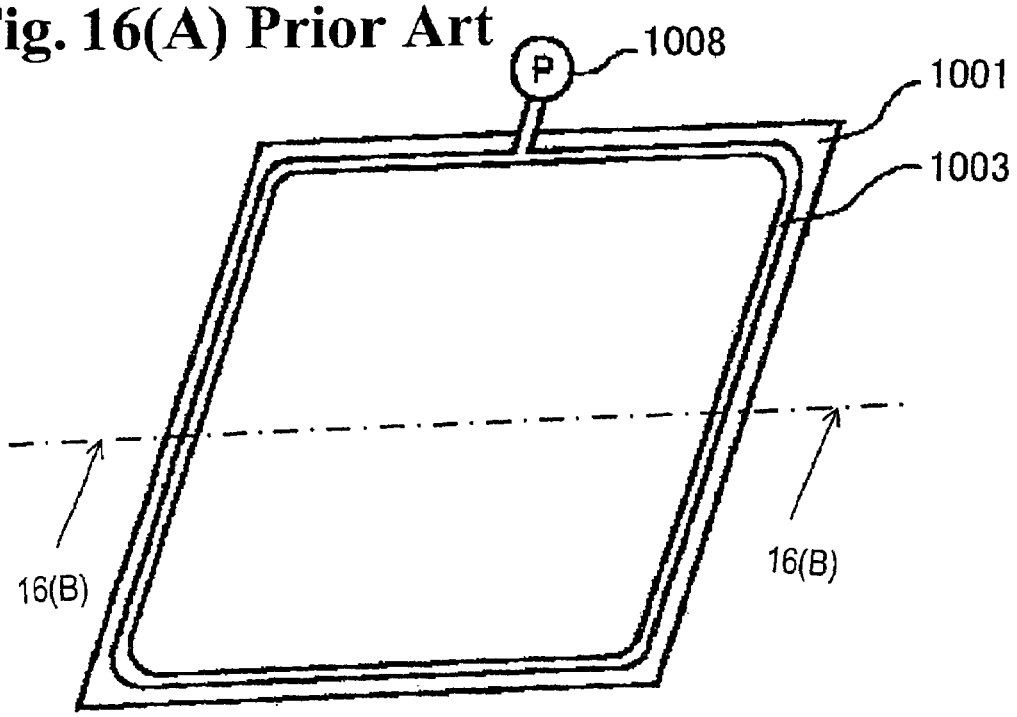
Figure 16B:
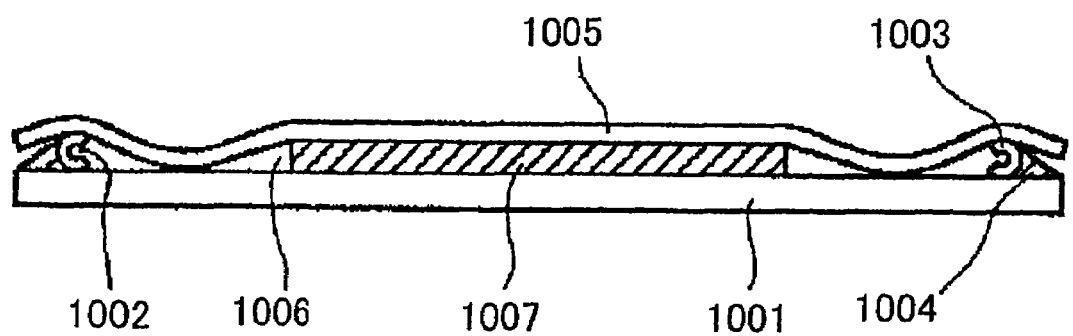
Figure 17:
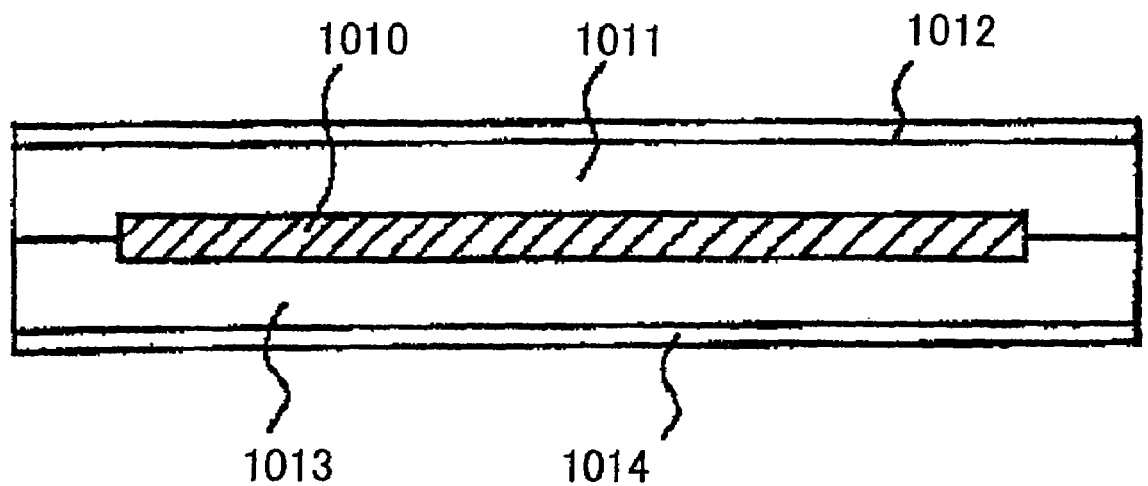
FIG. 17 is a schematic sectional view showing a solar cell module manufactured by a vacuum lamination apparatus.
Figure 18:
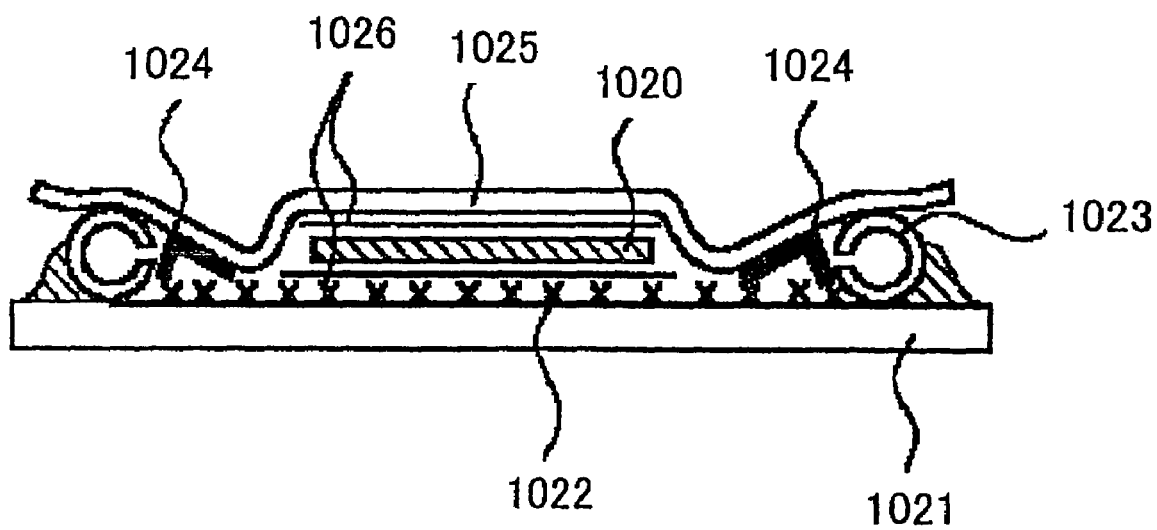
FIG. 18 is a schematic sectional view showing a conventional vacuum lamination apparatus having buffers along inside a tube.

FIG. 13 is a sectional view showing the lamination process and corresponds to FIG. 10, i.e. a sectional view taken along line 10-10 in FIG. 9. FIG. 14 is a sectional view showing the lamination process and corresponds to FIG. 11, i.e. a sectional view taken along line 11-11 in FIG. 9. These figures show a state in which the components 18 of the solar cell shown in FIG. 12 are arranged on the base plate 11 in face down, and the cover sheet 14 is placed to form the processing space 19.

In the vacuum lamination process, the components 18 of the solar cell module are placed on the base plate 11 in the area of the protrusions 11a. The releasing sheet 21 is placed on the components for preventing the thermo-adhesive sealants 18b and 18d flowing out of the components from sticking to the cover sheet 14. The cover sheet 14 is placed on the materials. In face down, the releasing sheet 21 contacts over the whole surface of the rear surface reinforcing member 18a of the components 18 of the solar cell module. The rear surface reinforcing member 18a is made of a material without air permeability such as a steel plate, so that the releasing sheet 21 is not necessarily a material exhibiting air permeability.

After arranging the materials mentioned above, the vacuum pump 110 starts to evacuate the processing space 19 formed by the cover sheet 14. The cover sheet 14 pushes the components 18 of the solar cell module against the base plate 11 and promotes degassing air between the materials of the components 18. At this time, the protrusions 11a formed on the base plate 11 form an air flow path and further promote degassing. While the vacuum pump 110 performs the degassing, the components 18 of the solar cell module are heated up to a temperature at which the thermo-adhesive sealants 18b and 18d are cures (for example 150° C.), and held at the temperature until completion of the curing (for example, 30 min.). Then, the valve 17 is closed and the vacuum lamination apparatus 10 is cooled while maintaining the vacuum inside the apparatus. Finally, the valve 17 is opened to return the processing space to the atmospheric pressure.

In the vacuum lamination process, both peripheral side regions of the cover sheet 14 at which the evacuation members are not arranged form bends 14a and 14b by the slab-like members 12W as shown in FIG. 14.

FIG. 15 shows a bend formed at a peripheral side region of the cover sheet, and is an enlarged view of the bend 14a shown in FIG. 14. In the embodiment, the protrusions 11a formed on the base plate 11 reach close to the slab-like members 12W, so that the processing space 19 is evacuated close to the slab-like members 12W. The cover sheet 14 closely contacts corners of the slab-like members 12W (bent points between the first bent faces 12Wc and the second bent faces 12We). The closely contact points work as sealing points. The cover sheet 14 is pushed by vacuum differential pressure at the sealing points and inside thereof. Accordingly, the covet sheet 14 is bent at the sealing points formed at the corners of the slab-like members 12W and extends along the first bent faces 12Wc of the slab-like members 12W. Thus, a bent portion 14a is formed in the cover sheet 14, thereby increasing secondary sectional moment of the cover sheet 14. When the secondary sectional moment of the cover sheet 14 is increased, the cover sheet 14 exhibits increased flexural rigidity and is hard to bend, thereby preventing lifting of the cover sheet at the sealing points.

A solar cell module manufacturing system that employs the vacuum lamination apparatus of the embodiment of the invention will be described next. The solar cell module manufacturing system that employs the vacuum lamination apparatus of the second embodiment of the invention has a structure basically same as that of the manufacturing system employing the vacuum lamination apparatus of the first embodiment shown in FIG. 6.

FIG. 6 is a sectional view showing the solar cell module manufacturing system 100 in which the vacuum lamination apparatus 10 are arranged, and the solar cell module is disposed in the processing space shown in FIG. 13. The solar cell module manufacturing system 100 comprises the hot gas convection furnace 101, for example, in which the vacuum lamination apparatus 10 of the embodiment of the invention is installed. The solar cell module manufacturing system 100 as shown in FIG. 6 can manufacture ten sheets of the solar cell modules at one time. Each of the vacuum lamination apparatuses 10 is connected to the exhaust manifold 102 in the furnace 101 through the valve 17 fitted to the exhaust port 16.

In the vacuum lamination process, the vacuum pump 110 starts and the power source of the furnace 101 is switched on to heat the vacuum lamination apparatuses while evacuating the processing spaces of the apparatuses. As described above, in the vacuum lamination process of the vacuum lamination apparatus 10, the both peripheral side regions of the cover sheet 14 are bent by the slab-like members 12W, so that the secondary sectional moment of the cover sheet 14 is increased. As a result, lifting of the cover sheet 14 along the seal points is sufficiently suppressed. Therefore, the cover sheet 14 closely contacts along the seal points and leakage to the processing space 19 is satisfactorily suppressed to accomplish high quality vacuum lamination. In the vacuum lamination apparatus 10 of the embodiment, the leakage to the processing space 19 is suppressed, so that it is possible to maintain a degree of vacuum in the processing space 19 at 1 Torr, for example.

The protrusions 11a extend close to the slab-like members 12W in the structure described above. When the area of the protrusions 11a extends close to the slab-like members 12W with a certain interval, the cover sheet 14 closely contacts the base plate at the interval, thereby creating a seal point. In such a case, the slab-like members 12W generate bends in the peripheral side region of the cover sheet. Accordingly, the secondary sectional moment of the cover sheet is increased, and the cover sheet closely contacts along the seal points to suppress leakage.

In the embodiment, the slab-like members 12W are used as guides to form bends in the peripheral side regions of the cover sheet 14, and may be formed of a plate member as far as the slab-like members have a bend cross-section perpendicular in the longitudinal direction. The base plate 11 may have such members as guides formed thereon without using separate members described above.

A member having a cross-section protruding from the base plate 11 or a part having a columnar section or a similar cross-section formed on the base plate 11 may be used as a guide for bending the peripheral side region of the cover sheet 14. When such a columnar member is used, the cover sheet 14 protrudes from the base plate 11 and generates a bend in the lamination process, thereby increasing the secondary sectional moment of the cover sheet 14. For examples, such members have a trapezoidal cross-section having a plane inclined towards a periphery of the base plate, or a round cross-section. When the members have a round cross-section, the members may have a diameter in the range of 2 to 3 mm for preventing three-dimensional distortion in the cover sheet 14 around corners at which ends of the bars contact the evacuation members. The bars with a round cross-section lead to lower machining cost.

In the embodiment, the components 18 of the solar cell module are arranged in face down in the vacuum lamination process. A face up arrangement can also be taken in the vacuum lamination process. In the face up arrangement, the releasing sheet 21 is favorably formed of an air permeating material. The lamination material is the components 18 of the solar cell module as described above, and is not limited thereto. The vacuum lamination apparatus can also be applied to production of other semiconductor devices that need the vacuum lamination process.

The present invention is applied to production of the solar cell modules and other semiconductor devices that need the vacuum lamination process in the production processes.

The disclosures of Japanese Patent Applications No. 2003-340345, filed on Sep. 30, 2003, and No. 2004-001671, filed on Jan. 7, 2004, are incorporated in the application.

While the invention has been explained with reference to the specific embodiments of the invention, the explanation is illustrative and the invention is limited only by the appended claims.

What is claimed is:

1. A vacuum lamination method of manufacturing a laminate module, comprising:

forming a continuous long gap between each of evacuation members and a base plate;

arranging the evacuation members to be spaced apart from each other with the long gaps facing each other;

placing a spacer in each of the gaps between the evacuation member and the base plate, the spacer preventing the gap from being blocked;

placing components of the laminate module on the base plate between the evacuation members fixed to the base plate at opposing sides thereof, covering the evacuation members and the base plate with a cover sheet to form a space for a lamination process, evacuating the space with a vacuum pump, and heating the space while maintaining evacuation to complete the lamination process for the components of the laminate module;

wherein each evacuation member has a triangular shape with an inclined surface facing upwardly relative to the base plate when placed on the base plate, said long gap being formed between an end of the inclined surface and the base so that the spacer extends from an inside to an outside of the triangular evacuation member through the gap.

2. A vacuum lamination method of manufacturing a laminate module, comprising:

forming a continuous long gap between each of evacuation members and a base plate, arranging the evacuation members to be spaced apart from each other with the long gaps facing each other, placing a spacer in each of the gaps between the evacuation member and the base plate, the spacer preventing the gap from being blocked, placing components of the laminate module on the base plate between the evacuation members and between guides arranged on the base plate with the components of the lamination module in between and extending perpendicularly between the evacuation members, said guides being arranged on the base plate to face each other, covering the evacuation members, the guides and the base plate with a cover sheet to form a space for a lamination process, evacuating the space with a vacuum pump, and heating the space while maintaining evacuation to complete the lamination process for the components of the laminate module;

wherein each evacuation member has a triangular shape with an inclined surface facing upwardly relative to the base plate when placed on the base plate, said long gap being formed between an end of the inclined surface and the base so that the spacer extends from an inside to an outside of the triangular evacuation member through the gap.

* * * * *

UNITED STATES PATENT AND TRADEMARK OFFICE
CERTIFICATE OF CORRECTION

PATENT NO. : 7,452,439 B2  Page 1 of 1
APPLICATION NO. : 10/923897
DATED : November 18, 2008
INVENTOR(S) : Yasuhiro Yokoyama It is certified that error appears in the above-identified patent and that said Letters Patent is hereby corrected as shown below:

Please change column 3, lines 13 to 14, "members and on; the base plate at opposites sides" to -- members and on the base plate at opposite sides --;

column 8, line 27, "taken along 8-8 in Fig. 7" to -- taken along line 8-8 in Fig. 7 --;

column 8, line 62, "view taken along 10-10 in Fig. 9" to -- view taken along line 10-10 in Fig. 9 --; and column 8, line 63, "view taken along 11-11 in Fig. 9" to -- view taken along line 11-11 in Fig. 9 --.

Signed and Sealed this

Sixth Day of January, 2009

JON W. DUDAS
*Director of the United States Patent and Trademark Office*